US012644336B2

(12) United States Patent
Skubic et al.

(10) Patent No.: US 12,644,336 B2
(45) **Date of Patent: *Jun. 2, 2026**

(54) STEP LADDER

(71) Applicant: Tricam Industries, Inc., Eden Prairie, MN (US)

(72) Inventors: Jeff Skubic, Eden Prairie, MN (US); Dennis D. Simpson, Plymouth, MN (US); Ben Williams, Chaska, MN (US); Yongxue Lu, Shanghai (CN)

(73) Assignee: Tricam Industries, LLC, Eden Prairie, MN (US)

( * ) Notice: Subject to any disclaimer, the term of this patent is extended or adjusted under 35 U.S.C. 154(b) by 905 days.

This patent is subject to a terminal disclaimer.

(21) Appl. No.: 17/539,486

(22) Filed: Dec. 1, 2021

(65) Prior Publication Data

US 2022/0162910 A1 May 26, 2022

Related U.S. Application Data

(63) Continuation of application No. 16/834,561, filed on Mar. 30, 2020, now Pat. No. 11,220,862, which is a (Continued)

(51) Int. Cl.

*E06C 1/393* (2006.01)
*E06C 1/16* (2006.01)
*E06C 7/14* (2006.01)

(52) U.S. Cl.

CPC ................ *E06C 1/393* (2013.01); *E06C 1/16* (2013.01); *E06C 7/14* (2013.01)

(58) Field of Classification Search

CPC ... E06C 1/00; E06C 1/387; E06C 1/39; E06C 1/393; E06C 1/14; E06C 1/16; E06C 1/18; E06C 7/14; E06C 7/16

(Continued)

(56) References Cited

U.S. PATENT DOCUMENTS 2,470,053 A 5/1949 Salisbury
2,650,014 A * 8/1953 Harrison .................. E06C 1/20 182/176

(Continued)

FOREIGN PATENT DOCUMENTS

AU 2007101150 1/2008
FR 2777593 10/1999

(Continued)

OTHER PUBLICATIONS

Polder® 3-Step Ladder. Crate and Barrel, http://www.crateandbarrel.com/polder-3-step-ladder/s451498, accessed May 6, 2015.

(Continued)

*Primary Examiner* — Colleen M Chavchavadze
*Assistant Examiner* — Shiref M Mekhaeil

(57) ABSTRACT

A ladder including a first frame, a second frame and a platform assembly. The first frame includes one or more fixed steps. The platform assembly includes a first platform pivotably coupled to the first frame, a second platform pivotably coupled to the first frame, a first linkage coupled between the second frame and one of the first platform and the second platform, and a second linkage coupled to the first platform and the second platform. The ladder is movable between a closed position and an open position.

12 Claims, 7 Drawing Sheets

Related U.S. Application Data continuation of application No. 14/617,441, filed on Feb. 9, 2015, now Pat. No. 10,648,234.

(60) Provisional application No. 61/950,287, filed on Mar. 10, 2014.

(58) Field of Classification Search
USPC .......................................................... 182/124
See application file for complete search history.

(56) References Cited

U.S. PATENT DOCUMENTS

| | | | | |
|---|---|---|---|---|
| 2,899,008 | A | 8/1959 | Larson | |
| 3,446,310 | A | 5/1969 | Alfie | |
| 4,270,463 | A | 6/1981 | Korzon | |
| 4,485,892 | A * | 12/1984 | Maloney | E06C 1/393 182/162 |
| 5,722,507 | A * | 3/1998 | Kain | E06C 1/393 182/104 |
| 5,967,260 | A * | 10/1999 | Spak | E06C 1/393 182/228.3 |
| 6,012,548 | A * | 1/2000 | Kim | E06C 1/393 182/161 |
| 6,347,687 | B1 * | 2/2002 | Alim | E06C 1/393 182/159 |
| 6,390,237 | B1 | 5/2002 | Kim et al. | |
| 6,390,238 | B1 * | 5/2002 | Gibson | E06C 1/387 182/161 |
| 6,427,805 | B1 * | 8/2002 | Gibson | E06C 1/387 182/165 |
| 6,443,261 | B1 * | 9/2002 | Gibson | E06C 7/14 182/104 |
| 6,454,050 | B2 * | 9/2002 | Gibson | E06C 1/393 182/161 |
| 6,550,579 | B2 * | 4/2003 | Gibson | E06C 1/387 182/161 |
| 6,698,699 | B1 | 3/2004 | Bailey | |
| 7,108,103 | B2 * | 9/2006 | Meeker | E06C 7/087 182/228.4 |
| 7,128,187 | B2 * | 10/2006 | Simpson | E06C 7/14 182/129 |
| 7,204,343 | B1 | 4/2007 | Seaman | |
| D548,364 | S * | 8/2007 | Skubic | D25/64 |
| D554,771 | S * | 11/2007 | Skubic | D25/64 |
| 7,849,967 | B2 * | 12/2010 | Gibson | E06C 1/393 182/25 |
| 7,861,826 | B2 * | 1/2011 | Meyers | E06C 7/16 182/120 |
| 7,931,123 | B2 * | 4/2011 | Moldthan | E06C 1/393 182/161 |
| 8,997,931 | B2 * | 4/2015 | Parker | E06C 1/387 182/180.1 |
| D766,461 | S | 9/2016 | Moss et al. | |
| D766,462 | S | 9/2016 | Moss et al. | |
| D777,350 | S | 1/2017 | Moss et al. | |
| 11,220,862 | B2 | 1/2022 | Skubic et al. | |
| 2002/0017431 | A1 * | 2/2002 | Gibson | E06C 7/14 182/161 |
| 2004/0000449 | A1 * | 1/2004 | Meeker | E06C 1/387 182/165 |
| 2004/0007424 | A1 * | 1/2004 | Simpson | E06C 7/14 182/161 |
| 2007/0181369 | A1 * | 8/2007 | Gibson | E06C 7/18 182/165 |
| 2007/0240935 | A1 * | 10/2007 | O'Brien | E06C 7/165 182/120 |
| 2007/0284192 | A1 * | 12/2007 | Meyers | A47C 12/00 182/129 |
| 2011/0024234 | A1 * | 2/2011 | Lin | E06C 1/387 182/161 |
| 2013/0048427 | A1 * | 2/2013 | Sordo | E06C 7/46 182/110 |
| 2014/0224585 | A1 * | 8/2014 | Russell | E06C 1/18 182/180.1 |
| 2014/0332316 | A1 | 11/2014 | Tiber et al. | |
| 2015/0090533 | A1 | 4/2015 | Moss et al. | |
| 2015/0159434 | A1 * | 6/2015 | Leng | E06C 1/393 182/163 |

FOREIGN PATENT DOCUMENTS

| | | |
|---|---|---|
| FR | 2816984 | 5/2002 |
| WO | WO 2010/084135 | 7/2010 |

OTHER PUBLICATIONS

Cosco Signature Series 6 ft. Premium Aluminum Step Ladder, Home Depot, http://www.homedepot.com/p/Cosco-Signature-Series-6-ft-Premium-Aluminum-Step-Ladder-2061AABLD/203642157, accessed May 6, 2015.

Werner 4 ft. Fiberglass Platform Step Ladder with 375 lb. Load Capacity Type IAA Duty Rating. Home Depot, http://www.homedepot.com/p/Werner-4-ft-Fiberglass-Platform-Step-Ladder-with-375-1b-Load-Capacity-Type-IAA-Duty-Rating-P7404/203134335, accessed May 6, 2015.

Application and File History for U.S. Appl. No. 14/617,441, filed Feb. 9, 2015. Inventors: Jeff Skubic et al.

Application and File History for U.S. Appl. No. 16/834,561, filed Mar. 30, 2020. Inventors: Jeff Skubic et al.

* cited by examiner

STEP LADDER

CROSS-REFERENCE TO RELATED APPLICATIONS

This application is a continuation of application Ser. No. 16/834,561, filed Mar. 30, 2020, now U.S. Pat. No. 11,220,862, which is a continuation of application Ser. No. 14/617,441, filed Feb. 9, 2015, now U.S. Pat. No. 10,648,234, issued May 12, 2020, which claims the benefit of U.S. Provisional Application No. 61/950,287, filed Mar. 10, 2014, each of which is hereby fully incorporated herein by reference.

FIELD OF THE INVENTION

The invention relates generally to ladders, and more specifically to a ladder having a plurality of foldable platform steps.

BACKGROUND OF THE INVENTION

Stepladders have historically been manufactured with fixed steps. Improvements to stepladders included providing a platform as the top step of the stepladder to provide additional room, user comfort, and safety.

SUMMARY OF THE INVENTION

In one embodiment, a ladder comprising a first frame, a second frame, a fixed step coupled to the first frame, and a platform assembly. The platform assembly includes a first platform pivotably coupled to the first frame, a second platform pivotably coupled to the first frame, a first linkage coupled between the second frame and one of the first platform and the second platform, and a second linkage coupled to the first platform and the second platform, wherein the ladder is configured to be movable between a closed position and an open position.

In one embodiment, a ladder comprising a first frame having a thickness, a second frame, and a platform assembly including a first platform pivotably coupled to the first frame and a second platform pivotably coupled to the first frame, wherein the ladder is configured to be movable between an open position and a closed position and wherein the platform assembly is configured to be positioned at least partly within a boundary defined by the thickness when the ladder is in the closed position

BRIEF DESCRIPTION OF THE DRAWINGS

Embodiments of the present invention may be more completely understood in consideration of the following detailed description of various embodiments of the invention in connection with the accompanying drawings, in which.

Figure 1:
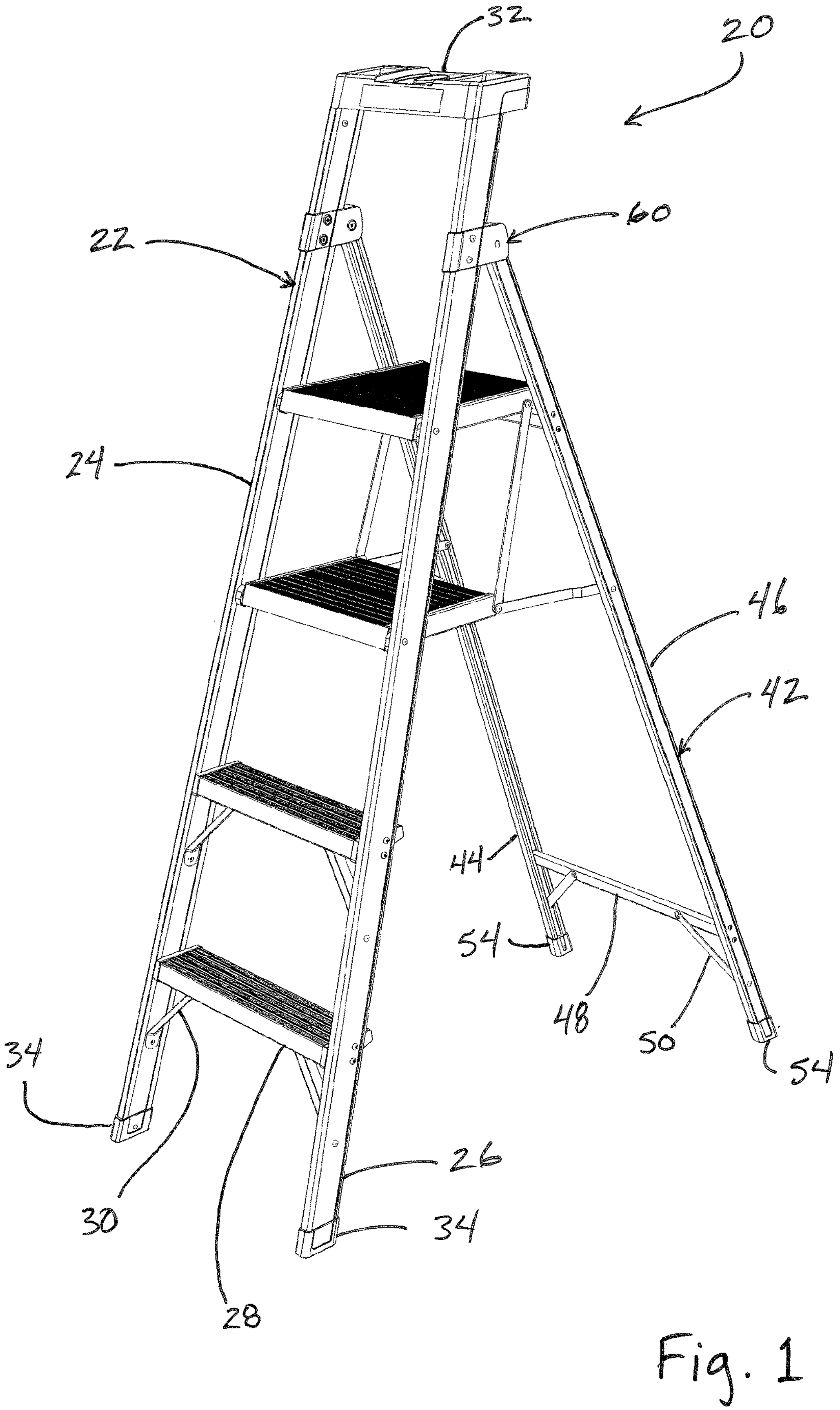
FIG. 1 is a perspective front profile view of a ladder in a deployed position according to an embodiment of the invention.

While the various embodiments of the invention are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the inventions as may be claimed.

DETAILED DESCRIPTION OF THE INVENTION

The following detailed description should be read with reference to the drawings in which similar elements in different drawings are numbered the same. The drawings, which are not necessarily to scale, depict illustrative embodiments and are not intended to limit the scope of the inventions as claimed.

Referring now generally to the Figures, a ladder 20 is depicted, generally comprising a first frame 22 pivotably coupled to a second frame 42, and a platform assembly 70. First frame 22 includes a first rail 24 and a second rail 26, separated by one or more fixed rungs 28 which may be secured to rails 24 and 26 by any suitable means, including removable fasteners such as screws or bolts, bonding, or welding. As depicted in the Figures, rails 24, 26 comprise a longitudinal axis of first frame 22. One or more bracing struts 30 may be included to provide additional support for rungs 28. The superior end of frame 22 may include a fixed utility tray 32. Alternately, the superior end of frame 22 includes a pivotable utility tray or a top fixed rung, or other fixed or pivotable platform. In other embodiments (not pictured) first frame 22 may comprise a unitary structure such that rail 24, rail 26 and one or fixed rungs 28 are a single component. Such a unitary frame 22 could be constructed, for example, from various known polymers through various known molding techniques, or from fiber-reinforced plastics, or from various composite materials such as glass or carbon fibers.

Referring again generally to the Figures, each of rails 24 and 26 may optionally include feet 34 disposed on an inferior end of the rail, the feet 34 configured to provide increased slip resistance and/or increased stability and/or decreased marring. Rails 24 and 26 may be oriented parallel to one another, or oriented such that the rails are spaced farther apart on the inferior end than on the superior end so as to provide additional stability.

Second frame 42 includes a first rail 44 and a second rail 46, separated by one or more fixed crossmembers 48 which may be secured to rails 44 and 46 by any suitable means, including removable fasteners such as screws or bolts, bonding, or welding. As depicted in the Figures, rails 44, 46 comprise a longitudinal axis of first frame 42. One or more bracing struts 50 may be included to provide additional support for rungs 48. In other embodiments (not pictured) second frame 42 may comprise a unitary structure such that rail 44, rail 46 and one or crossmembers 48 are a single component. Such a unitary frame 42 could be constructed, for example, from various known polymers through various known molding techniques, or from fiber-reinforced plastics, or from various composite materials such as glass or carbon fibers.

Referring again generally to the Figures, each of rails 44 and 46 may optionally include feet 54 disposed on an inferior end of the rail, the feet 54 configured to provide increased slip resistance and/or increased stability and/or decreased marring. Rails 44 and 46 may be oriented parallel to one another, or oriented such that the rails are spaced farther apart on the inferior end than on the superior end so as to provide additional stability. Rails 44 and 46 of second frame 42 may be oriented similarly to, or differently than, rails 24 and 26 of first frame 22.

Figure 3:
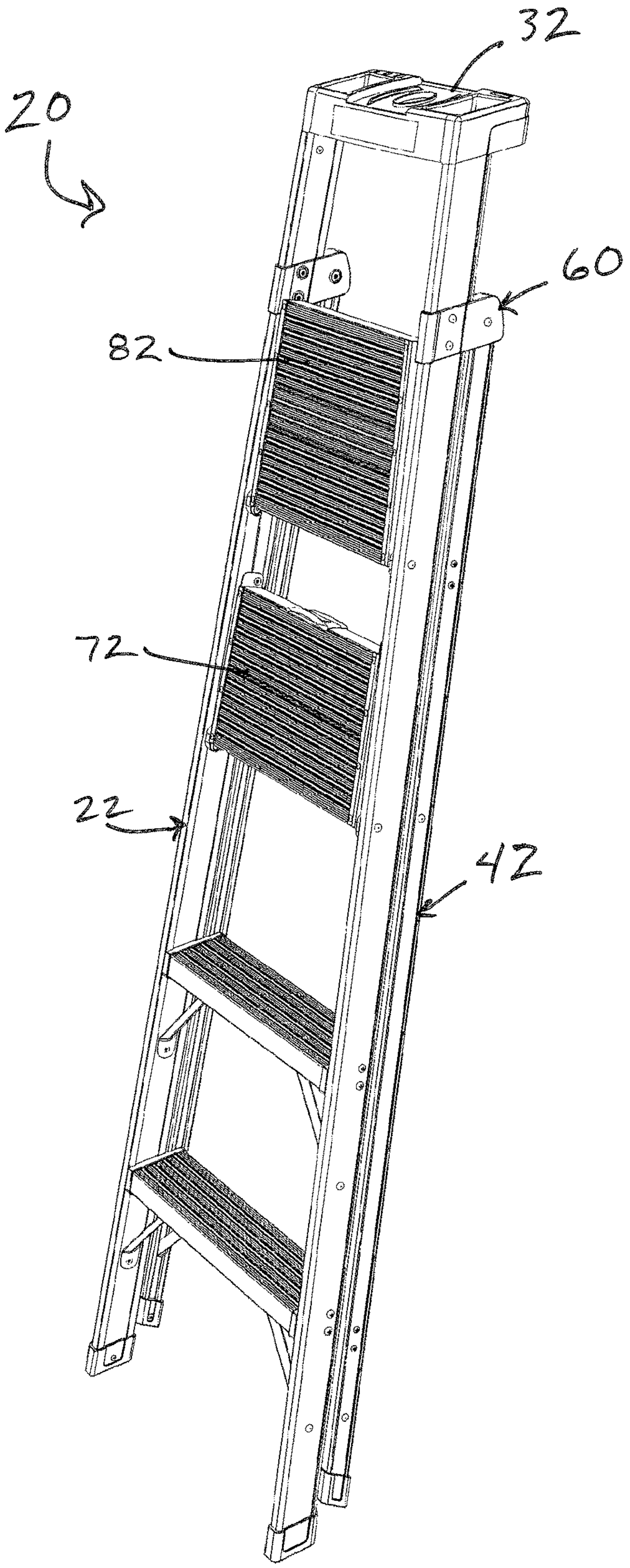
FIG. 3 is a perspective front profile view of a ladder in a closed position according to an embodiment of the invention.
Figure 4:
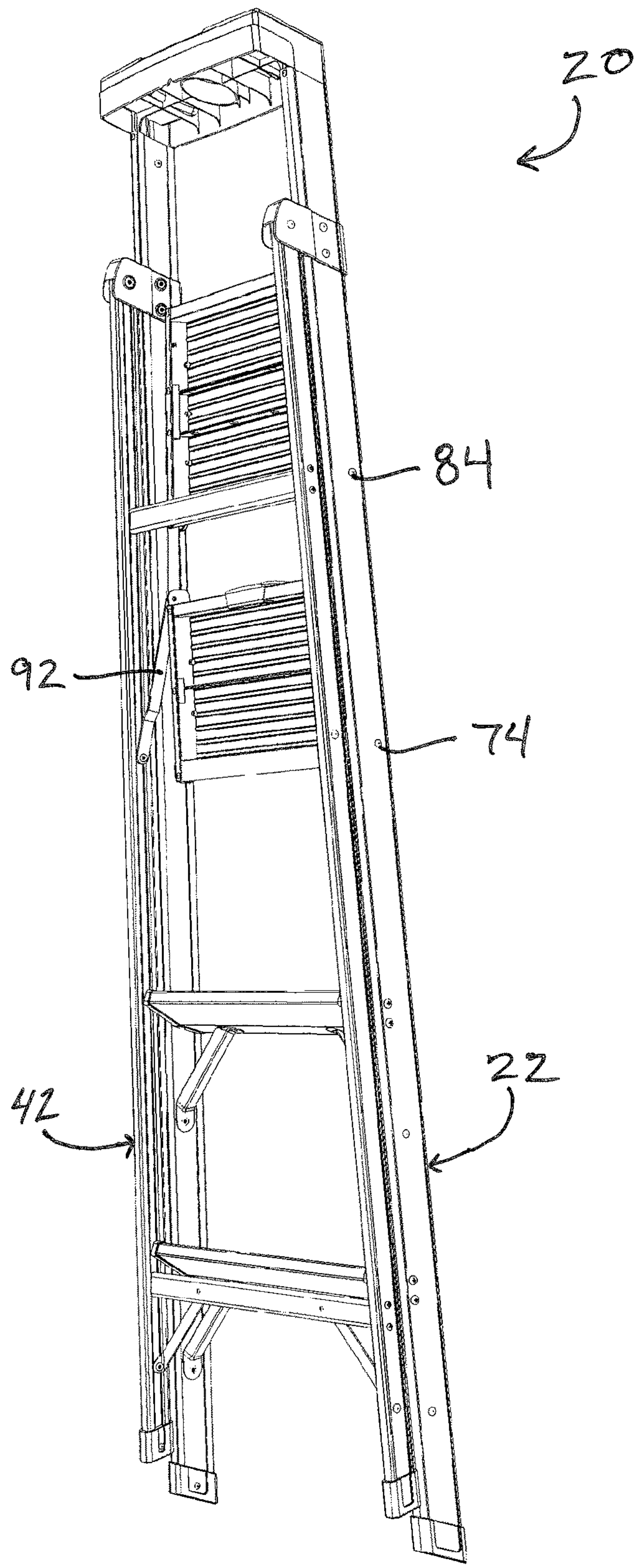
FIG. 4 is a perspective rear profile view of the ladder of FIG. 3.
Figure 5:
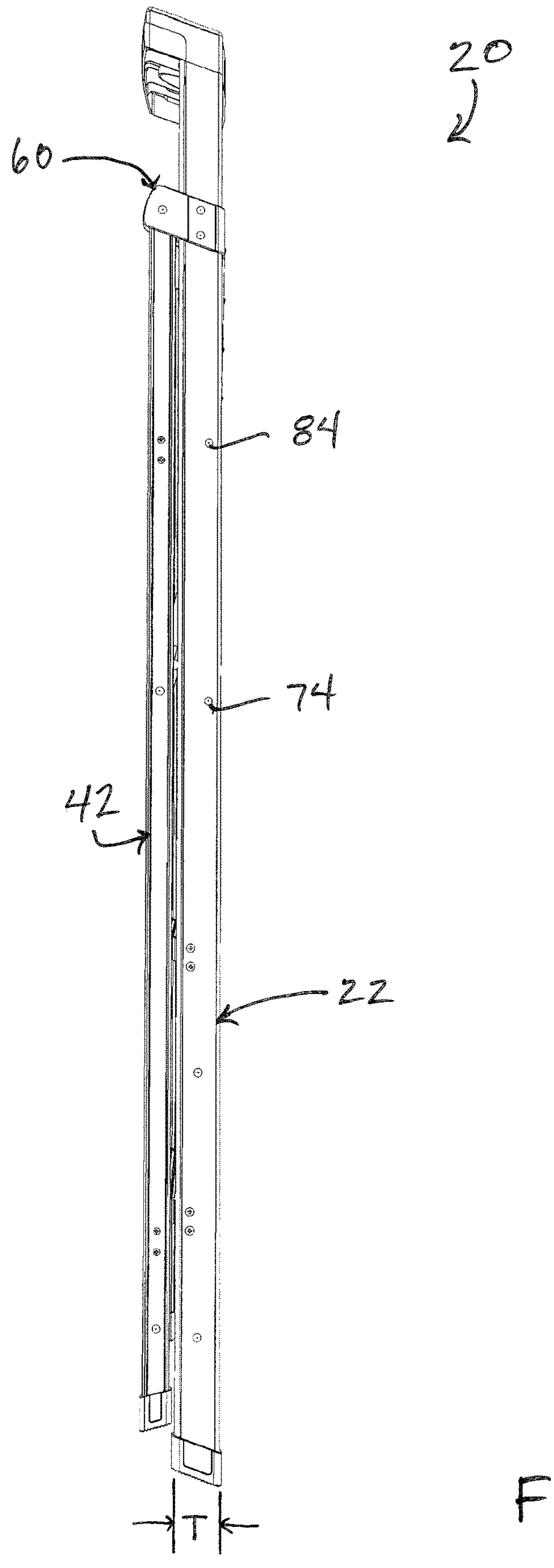
FIG. 5 is a perspective side view of the ladder of FIG. 3.

First frame 22 and second frame 42 are hingedly or pivotably coupled to another via hinge assemblies 60, so as to allow ladder 20 to be folded into a storage position as depicted in FIGS. 3-5. Hinge 60 includes a first portion 62 configured to be secured to rails 24, 26 of first frame 22, and a second portion 64 configured to be secured to rails 44, 46 of second frame 42. First portion 62 and second portion 64 are joined via pivot point 66.

Referring now to platform assembly 70, as depicted in the Figures the assembly includes a lower platform 72 and an upper platform 82. In other arrangements (not pictured), platform assembly includes a single platform, or more than two platforms. Each of lower platform 72 and upper platform 82 are pivotably coupled to one of first frame 22 or second frame 22. As depicted generally in the Figures, lower platform 72 is pivotably coupled to first frame 22 at forward pivot point 74 and secured by suitable means such as a removable fastener, and upper platform 82 is pivotably coupled to second frame 42 at forward pivot point 84 and also secured by suitable means such as removable fasteners. In other embodiments (not pictured), the platforms may be pivotably coupled to second frame 42 rather than first frame 22.

One or more tie bars 90 are provided between lower platform 72 and upper platform 82, and are pivotably coupled thereto via rear pivot points 76 and 86, respectively. One or more linkage bars 92 are provided between rear pivot points 86 of lower platform 72 and second frame 42. Alternately, linkage bar 92 may be provided between second frame 42 and a point on tie bar 90. Upper platform 82 is sized to span the distance from first frame 22 to second frame 42 and rest on a crossmember 48, while lower platform 72 is sized to span approximately half of the distance from first frame 22 to second frame 42, as generally depicted in the Figures. Other sizes and configurations of the platforms are also within the scope of the invention.

In use, ladder 20 is movable between a closed, collapsed position and an open, deployed position. Referring to FIGS. 3-5, ladder 20 is depicted in the closed, collapsed position wherein first frame 22 and second frame 42 are folded together, platforms 72, 82 are generally aligned with rails 24, 26, and tie bars 90 and linkage bars 92 are folded together. First frame 22 and second frame 42 are aligned such that the longitudinal axes of each of the frames are parallel to one another. To move ladder 20 from the closed, collapsed position to the open, deployed position, a user may simply pull apart frames 22 and 42 from one another.

As best depicted in the side view of FIG. 5, first frame 22 defines a thickness T, and in one embodiment platforms 72, 82 are configured to be positioned wholly within a boundary defined by thickness T when ladder 20 is in the closed, collapsed position. As also depicted in FIG. 5, tie bars 90 and linkage bars 92 are similarly configured to be positioned wholly within a boundary defined by thickness T when ladder 20 is in the closed, collapsed position, such that all of platform assembly 70 is positioned wholly within the boundary defined by thickness T. In another embodiment (not pictured) one or more of platforms 72, 82, tie bars 90 and/or linkage bars 92 are configured to be positioned substantially within a boundary defined by thickness T when ladder 20 is in the closed, collapsed position. In another embodiment (not pictured) one or more of platforms 72, 82, tie bars 90 and/or linkage bars 92 are configured to be positioned at least partly within a boundary defined by thickness T when ladder 20 is in the closed, collapsed position. In another embodiment (not pictured) wherein platforms 72, 82 are pivotably coupled to second frame 42 rather than first frame 22, platforms 72, 82, tie bars 90 and/or linkage bars 92 are configured to be positioned at least partly within a boundary defined by a thickness of second frame 42 when ladder 20 is in the closed, collapsed position.

Figure 2:
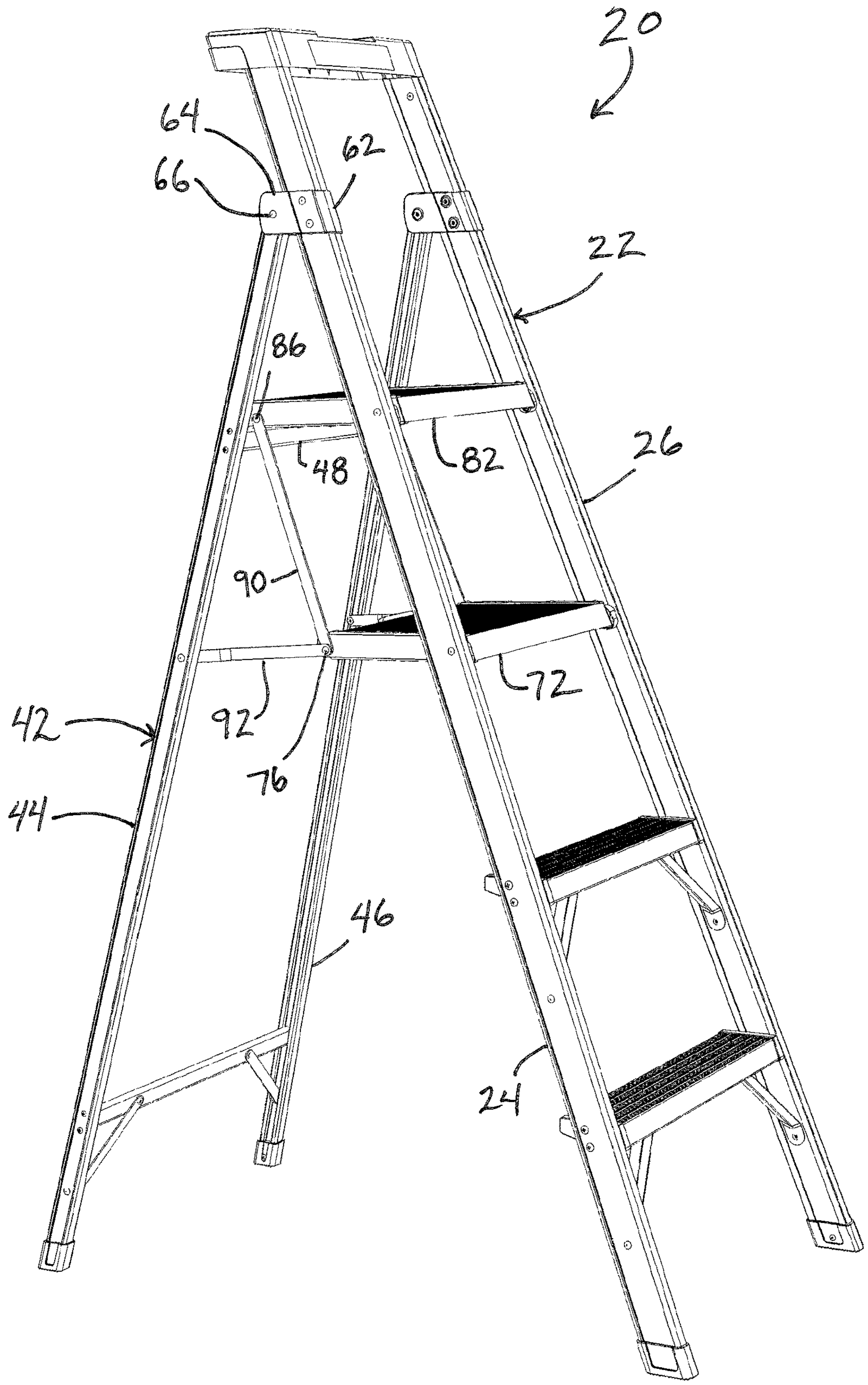
FIG. 2 is a perspective side profile view of the ladder of FIG. 1.

Referring to FIGS. 1-2, ladder 20 is depicted in the deployed position with first frame 22 and second frame 42 opened such that lower platform 72 and linkage bars 92 are fully extended, limiting further opening between first frame 22 and second frame 42. In other embodiments, hinge assemblies 60 may also limit the extent of opening between first frame 22 and second frame 42. With ladder 20 in the deployed position and placed on a flat, level surface, platforms 72, 82 are in a generally horizontal position suitable for standing upon. That is, the stepping surface of each of platforms 72, 82 are generally parallel to the surface upon which ladder 20 is placed. To move ladder 20 from the open, deployed position to the closed, collapsed position, a user may urge the rearward edge of upper platform 82 upwards, causing frames 22, 42 to be brought toward one another.

Figure 6:
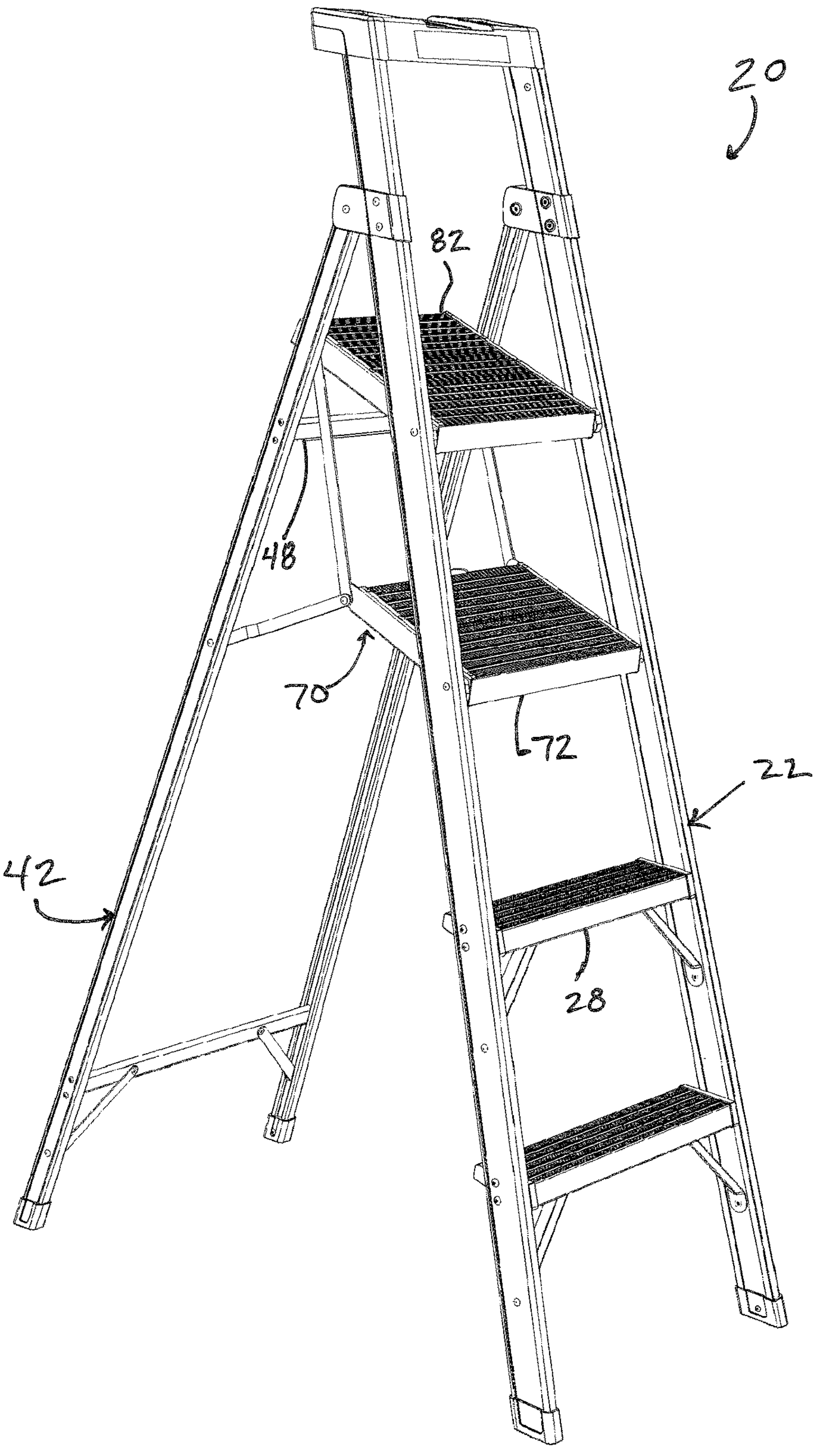
FIG. 6 is a perspective front profile view of a ladder according to an embodiment of the invention.
Figure 7:
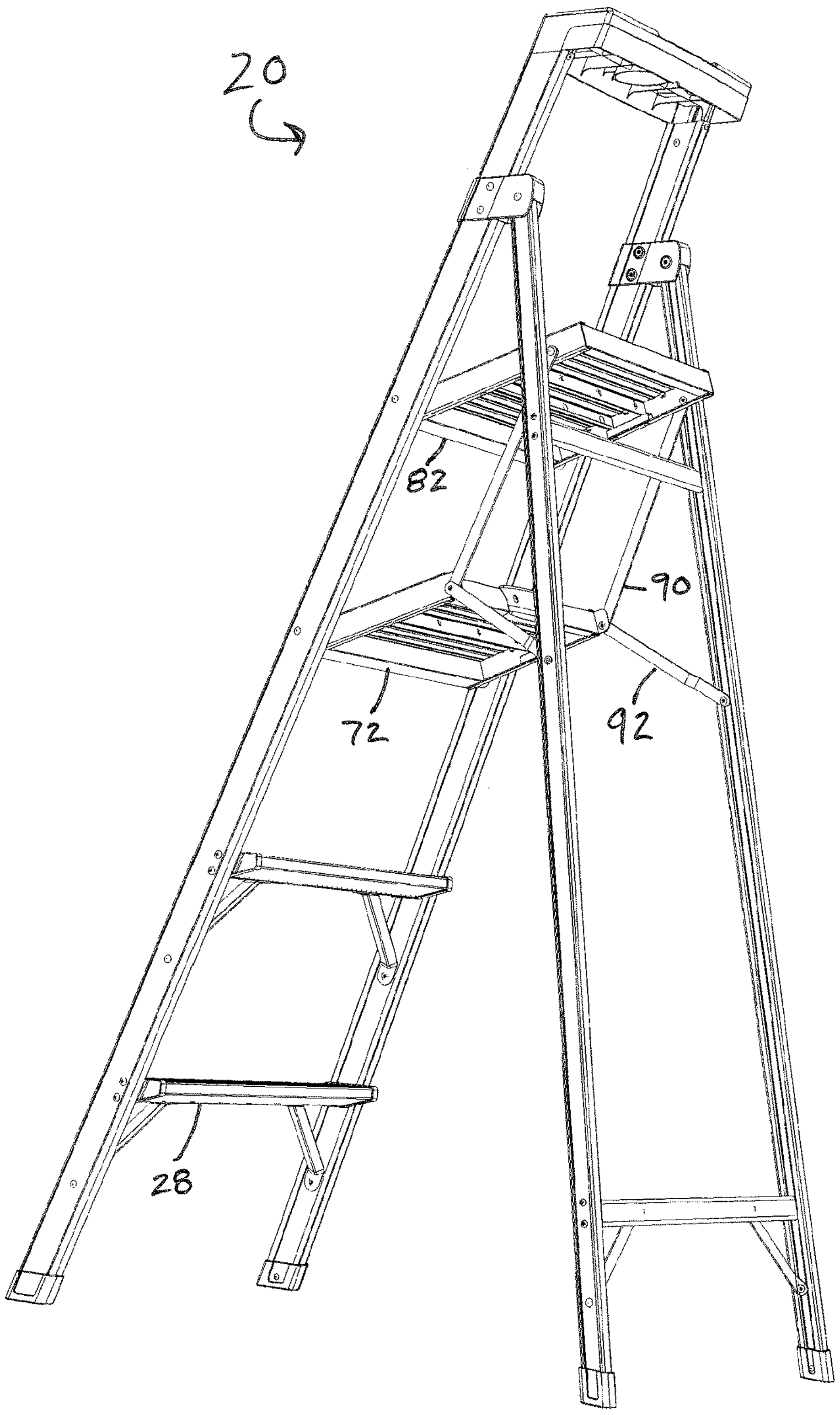
FIG. 7 is a perspective rear profile view of the ladder of FIG. 6.

Referring to FIGS. 6-7, ladder 20 is depicted in a position midway between the closed, collapsed position of FIGS. 3-5 and the open, deployed position of FIGS. 1-2.

Ladder 20 may be constructed in whole or in part of wood, composites including glass fiber, carbon fiber or other known suitable composites, polymers, reinforced polymers including fiber-reinforced plastic (FRP), metal including aluminum or steel, or any combination thereof.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims. Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A ladder, comprising:

a first frame;

a second frame comprising a crossmember;

a platform assembly, including:

a lower platform comprising a stepping surface and pivotably coupled to the first frame;

an upper platform comprising a stepping surface and pivotably coupled to the first frame;

a linkage bar coupled between the second frame and the lower platform;

a tie bar coupled to the lower platform and the upper platform or the first frame, wherein the ladder is configured to be movable between a closed position and an open position; and a fixed step having a stepping surface and being arranged below the platform assembly, the fixed step extending beyond a thickness of the first frame in a direction toward the second frame and the fixed step not extending beyond the thickness of the first frame in the opposite direction, wherein the fixed step is configured to be positioned wholly within a boundary defined by combining the thickness of the first frame and a thickness of the second frame when the ladder is in the closed position, wherein the linkage bar is movable with respect to both the lower platform and one of the first frame or second frame when the ladder is moved between the closed position and the open position, wherein the stepping surfaces of the upper platform, lower platform and fixed step are generally parallel to one another when the ladder is in the open position, and wherein the upper platform rests on the crossmember and the tie bar does not extend above the upper platform or below the lower platform when the ladder is in the open position.

2. The ladder of claim 1, further comprising a hinge disposed between the first frame and the second frame.

3. The ladder of claim 1, wherein the linkage bar is coupled between the second frame and the lower platform, and further wherein the open position of the ladder is limited at least in part by the linkage bar.

4. The ladder of claim 1, wherein the open position of the ladder includes the upper platform and the lower platform oriented generally parallel to a surface on which the ladder is located.

5. The ladder of claim 1, wherein the first frame and second frame each include a longitudinal axis, and further wherein the closed position of the ladder includes the longitudinal axis of the first frame generally parallel to the longitudinal axis of the second frame.

6. The ladder of claim 5, wherein the closed position of the ladder further includes the upper platform and the lower platform oriented generally parallel to the longitudinal axes of the first and second frames.

7. The ladder of claim 1, wherein the lower platform is supported in the open position at least in part by the tie bar.

8. The ladder of claim 1 wherein at least a portion of the platform assembly is configured to be positioned at least partly within a boundary defined by the thickness of the first frame when the ladder is in the closed position.

9. The ladder of claim 1 wherein at least a portion of the platform assembly is configured to be positioned wholly within a boundary defined by the thickness of the first frame when the ladder is in the closed position.

10. A ladder, comprising:

a first frame having a thickness;

a second frame comprising a crossmember;

a platform assembly, including:

a lower platform comprising a stepping surface and pivotably coupled to the first frame;

an upper platform comprising a stepping surface and pivotably coupled to the first frame;

a linkage bar coupled between the second frame and the lower platform; and a tie bar coupled to the upper platform and the lower platform;

wherein the ladder is configured to be movable between an open position and a closed position and wherein the platform assembly is configured to be positioned within a boundary defined by the thickness of the first frame when the ladder is in the closed position; and a fixed step having a stepping surface and being arranged below the platform assembly, the fixed step extending beyond the thickness of the first frame in a direction toward the second frame and the fixed step not extending beyond the thickness of the first frame in the opposite direction, wherein the fixed step is configured to be positioned wholly within a boundary defined by combining the thickness of the first frame and a thickness of the second frame when the ladder is in the closed position, wherein the linkage bar is movable with respect to both the lower platform and one of the first frame or second frame when the ladder is moved between the closed position and the open position, wherein the stepping surfaces of the upper platform, lower platform and fixed step are generally parallel to one another when the ladder is in the open position, and wherein the upper platform rests on the crossmember and the tie bar does not extend above the upper platform or below the lower platform when the ladder is in the open position.

11. The ladder of claim 10, wherein the first frame and second frame each include a longitudinal axis, and further wherein the closed position of the ladder includes the longitudinal axis of the first frame generally parallel to the longitudinal axis of the second frame.

12. The ladder of claim 11, wherein the closed position of the ladder further includes the upper platform and the lower platform oriented generally parallel to the longitudinal axes of the first and second frames.

* * * * *